United States Patent [19]

Hughes

[11] 4,372,042

[45] Feb. 8, 1983

[54] METHOD FOR MANUFACTURING DIAMOND PICK-UP STYLUS

[75] Inventor: George F. Hughes, Palm Beach Gardens, Fla.

[73] Assignee: Diamagnetics, Inc., West Palm Beach, Fla.

[21] Appl. No.: 186,682

[22] Filed: Sep. 12, 1980

[51] Int. Cl.³ .................. H01R 43/00; B24B 1/00; B28D 5/04

[52] U.S. Cl. .................. 29/825; 29/885; 51/283 R; 125/39; 369/173

[58] Field of Search .............. 29/874, 876, 877, 878, 29/885, 592 R, 557, 558, 825; 369/126, 151, 173; 51/283, 281, 327, 326; 125/30 R, 39

[56] References Cited

U.S. PATENT DOCUMENTS

| | | | |
|---|---|---|---|
| 3,585,764 | 6/1971 | Hulsman | 51/327 X |
| 4,113,266 | 9/1978 | Alexandrovich | 369/173 X |
| 4,120,742 | 10/1978 | Asano et al. | 369/173 X |
| 4,165,560 | 8/1979 | Matsumoto | 29/885 |

FOREIGN PATENT DOCUMENTS

| | | | |
|---|---|---|---|
| 885163 | 8/1953 | Fed. Rep. of Germany | 369/173 |
| 1392632 | 4/1975 | United Kingdom | 369/173 |

Primary Examiner—Francis S. Husar
Assistant Examiner—Carl J. Arbes
Attorney, Agent, or Firm—Kane, Dalsimer, Kane, Sullivan and Kurucz

[57] ABSTRACT

A method is provided for forming a pick-up stylus having a record engaging edge located at a predetermined angle with respect to an electrically conductive surface. Two identical jewel elements each having a flat surface, joined together along their flat surfaces. The forward end of the joined work product is ground to a conical tip and the work product is then separated into the two elements each now having a semi-conical tip. A pair of flats are gound on each tip on opposite sides of the semi-cone apex. The flats extend from the previously joined flat surface and intersect each other along an edge which defines the predetermined angle with the previously joined flat surface.

4 Claims, 6 Drawing Figures

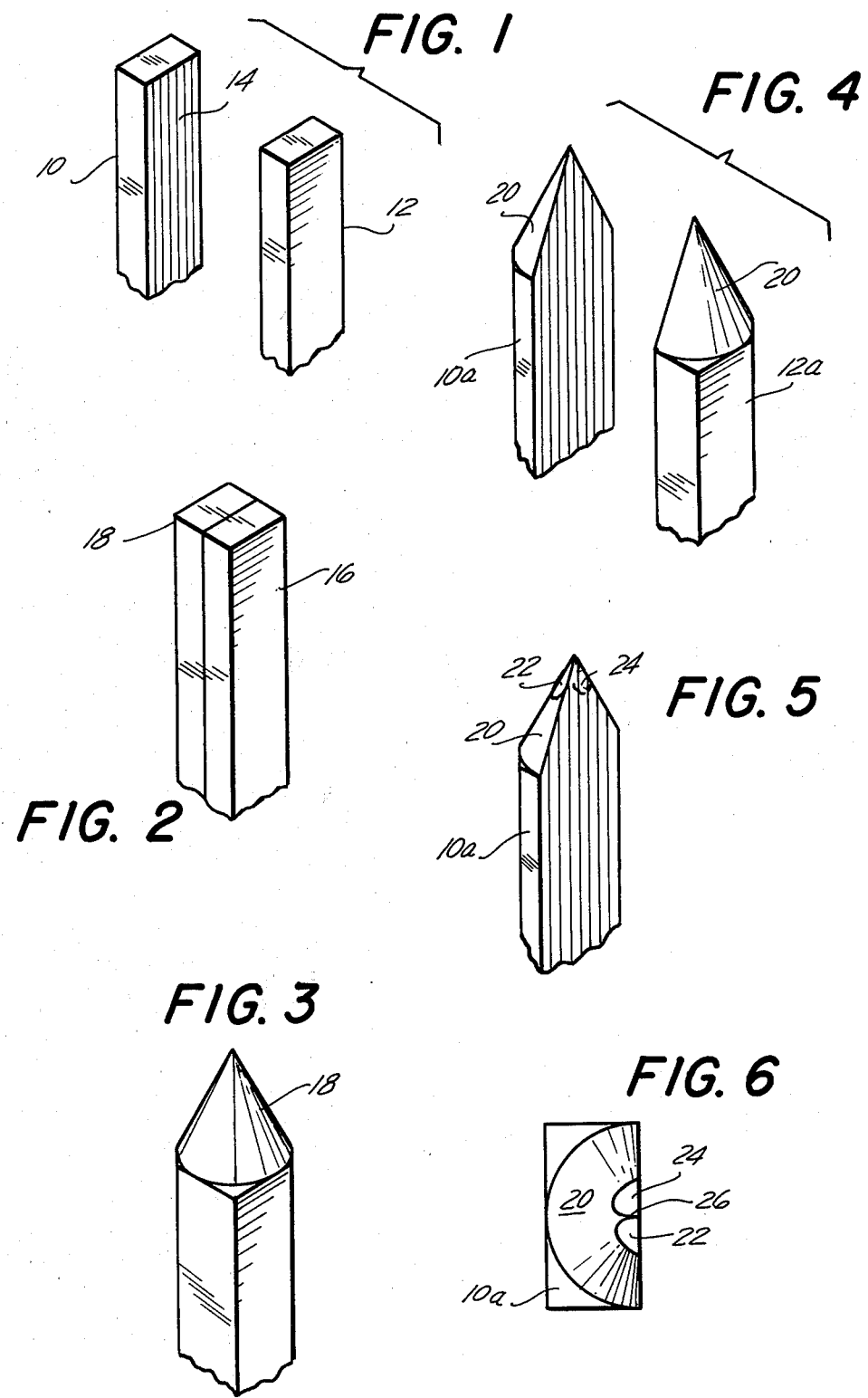

METHOD FOR MANUFACTURING DIAMOND PICK-UP STYLUS

BACKGROUND OF THE INVENTION

The present invention relates to diamond styli for video disc players and in particular to an improved method for manufacturing such styli.

In U.S. Pat. No. 4,165,560 which issued on Aug. 28, 1979 to Yasushi Matsumoto for METHOD FOR MANUFACTURING A DIAMOND STYLUS FOR VIDEO DISC PLAYERS a method is disclosed for the manufacture of video disc styli. Such styli are used in the playback of video discs in a system such as that disclosed in U.S. Pat. No. 3,842,194 which issued on Oct. 15, 1974 to J. K. Clemens.

In the method disclosed in the Matsumoto patent, a conical shape is ground at one end of a square diamond shaft and a flat electrode-bearing surface is then ground into the conical surface. A record engaging surface is then ground cross-wise at a right angle to the electrode-bearing surface following which two converging flat surfaces are ground. Finally a metallic coating is deposited on the electrode surfaces of the diamond. In the resultant stylus, the record engaging surface is disposed substantially orthogonally to the electrode-bearing surface. Thus, the grinding steps described above are performed to provide a record engaging surface having the needed relationship to the electrode surface.

As will be readily apparent to those familiar with the diamond grinding art, the cost of producing a particular configuration is related to the mass of diamond which must be precisely removed. Thus, while diamonds may be rough cut to remove large quantities of diamond at relatively moderate expense, where precise surface relationships are required, precise grinding techniques must be employed which greatly add to the cost of the final product.

The conical grinding operation discussed in the Matsumoto process is one which is relatively simple and may be performed as a rough grinding operation on commercial grinding machines. The grinding of the remaining faces, however, requires precise grinding techniques which add substantially to the cost of the final stylus.

In view of the above, it is a principal object of the present invention to provide an improved method for producing a diamond playback stylus of the type discussed above in which a major portion of the material to be removed may be rough ground leaving only relatively small portions requiring precise grinding;

A further object is to employ such a method to produce a playback diamond stylus which has comparable performance characteristics to styli produced by other grinding techniques, while affording a substantial cost saving over such other techniques;

A still further object is to provide a method which utilizes conventional grinding equipment and procedures.

SUMMARY OF THE INVENTION

The above and other beneficial objects and advantages are attained in accordance with the present invention by providing an improved method of grinding a pick-up stylus for the playback of pre-recorded signals in which the vast majority of the material to be removed is removed in a rough cutting operation.

As with conventional grinding techniques for producing such styli, a square shank diamond is utilized as the initial work piece. Such diamond work pieces are readily available commercially.

In accordance with the present invention, a pair of such diamonds are glued together along one of its faces. One end of the joined product is then rough ground to a conical tip with the axis of the cone aligning with the joining plane.

The two elements are then separated whereby each element has at its tip a semi-conical surface. A pair of flats are then ground into each semi-conical surface with the flats extending from the previously joined surface. The two flats are so configured that their joining line defines a record engaging edge properly positioned with respect to the joined face. A conductive coating is then applied to that face.

It should be appreciated that the final grinding operation described above need only take place over a relatively small surface since the major portion of the diamond material was removed during the rough grinding operation.

BRIEF DESCRIPTION OF THE DRAWINGS

In the accompanying drawings:

FIG. 1 is a perspective view of a pair of square shank jewel elements;

FIG. 2 is a perspective view of the jewel elements bonded to one another;

FIG. 3 is a perspective view of the joined jewel elements after the rough grinding operation;

FIG. 4 is a perspective view similar to FIG. 1 showing the two jewel elements separated after the rough grinding operation;

FIG. 5 is a perspective view of a jewel element after the final grinding of the contact edge defining flats the application of and a conductive coating thereby providing the desired pick-up stylus; and, FIG. 6 is a top plan view of the pick-up stylus.

DETAILED DESCRIPTION OF THE PREFERRED EMBODIMENT

Reference is now made to the drawings and to FIG. 1 in particular wherein a pair of identical square shank jewel elements 10 and 12 are depicted. As mentioned, such square shank jewel elements are commercially available and readily obtainable. The elements are preferably formed of diamond although other jewels such as sapphire may be used.

As shown in FIG. 2, a work product 16 is formed by joining the work pieces 10 and 12 with the faces 14 abutting each other. The members 10 and 12 may be joined with an adhesive such as glue or epoxy. The forward end 18 of the joined work piece 16 is then ground to a conical point (as shown in FIG. 3) utilizing conventional equipment such as conical grinder. Such equipment is widely used in the industry and produces a point similar to that produced by a conventional pencil sharpener. Since the jewel elements 10 and 12 are identical, the axis of the conical tip 18 will align with the plane of the joined surfaces 14 of elements 10 and 12. The conical grinding is a rough grinding operation which may readily and inexpensively be performed.

As shown in FIG. 4, after conical grinding, the work piece 16 is separated into the two elements 10a and 12a each one now having a semi-conical forward tip portion 20. It should be noted that the members 10A and 12A are still identical with each other and each may subsequently be worked on separately to produce the desired pick-up stylus. To this end, a pair of flats 22 and 24 are ground on each of the members 10A and 12A. The flats, each defining a plane, are on opposite sides of the apex of the triangle projection of the conical tip on face 14 (as shown in FIG. 5) and each of the flats extends from face 14. The flats 22 and 24 define a pair of planes which intersect along a line 26. By properly orienting the planes of flats 22 and 24, the intersecting line 26 may be formed orthogonal to the surface 14 thereby providing a record engaging edge.

The surface 14 is then coated with an electrically conductive material, such as gold. The coating may be applied by any well known technique such as vacuum evaporation or sputtering.

Referring to FIG. 6, it may be noted that the flats 22 and 24 comprise a relatively small portion of the semi-conical surface 20. To produce the flats very little material must be precisely ground away. Nonetheless, it will thus be appreciated that the desired relationship between record engaging edge 26 and conducting surface 14 is obtained with a minimum of precise grinding.

Thus, in accordance with the above, the aforementioned objectives are attained.

Having thus described the invention, what is claimed is:

1. A method for forming a pick-up stylus for playing back pre-recorded signals on a record disc, said method comprising the steps of:
   (a) providing a pair of elongated jewel elements, each of said elements having a generally flat surface extending parallel to the longitudinal axis of said element;
   (b) joining said jewel elements along said flat surfaces whereby to form an elongated work product having a forward end;
   (c) rough grinding said work product forward end to a conical surface;
   (d) separating said work product along said joined flat surfaces into two jewel elements each having a semi-conical surface at the forward end thereof; and,
   (e) fine grinding pair of planes onto each jewel element semi-conical surface, said planes extending from said jewel element flat surface and intersecting along a line defining a record engaging edge.

2. The method in accordance with claim 1 wherein said pair of jewel elements are identical.

3. The method in accordance with claim 1 wherein each of said jewel elements has a rectangular cross-section and said flat surface comprises one face of said rectangular cross-section.

4. The method in accordance with claims 1, 2 or 3 comprising the further step of coating each of said flat surfaces with a layer of electrically conductive material.

* * * * *